(12) United States Patent
Nemoto et al.

(10) Patent No.: US 12,541,695 B2
(45) Date of Patent: Feb. 3, 2026

(54) PREDICTOR INTERACTIVE LEARNING SYSTEM, PREDICTOR INTERACTIVE LEARNING METHOD, AND PROGRAM

(71) Applicant: NTT Data Japan Corporation, Tokyo (JP)

(72) Inventors: Hiroyuki Nemoto, Tokyo (JP); Ayaka Iwamoto, Tokyo (JP); Shigemasa Mitoma, Tokyo (JP); Qingci Zhao, Tokyo (JP)

(73) Assignee: NTT Data Japan Corporation, Tokyo (JP)

( * ) Notice: Subject to any disclaimer, the term of this patent is extended or adjusted under 35 U.S.C. 154(b) by 798 days.

(21) Appl. No.: 17/781,987

(22) PCT Filed: Jan. 5, 2021

(86) PCT No.: PCT/JP2021/000046
§ 371 (c)(1),
(2) Date: Jun. 2, 2022

(87) PCT Pub. No.: WO2021/141009
PCT Pub. Date: Jul. 15, 2021

(65) Prior Publication Data
US 2023/0004838 A1    Jan. 5, 2023

(30) Foreign Application Priority Data
Jan. 6, 2020    (JP) .................................. 2020-000443

(51) Int. Cl.
*G06N 3/09*    (2023.01)
*G06F 40/279*    (2020.01)
(Continued)

(52) U.S. Cl.
CPC ............. *G06N 5/04* (2013.01); *G06F 40/279* (2020.01); *G06N 20/00* (2019.01)

(58) Field of Classification Search
CPC .......... G06N 3/09; G06N 3/091; G06F 40/20; G06F 40/279; G06F 40/295
See application file for complete search history.

(56) References Cited

U.S. PATENT DOCUMENTS

2014/0163951 A1* 6/2014 Nikoulina ............... G06F 40/42
704/4
2018/0018320 A1* 1/2018 Boyer ..................... G06F 16/35
(Continued)

FOREIGN PATENT DOCUMENTS

JP    2008-225907 A    9/2008

OTHER PUBLICATIONS

Sawayama, Atsuki et al., "Named Entity Recognition Improvement through Semi-supervised Data Construction", IPSJ SIG Technical Report: Spoken Language Processing(SLP) 2016-SLP-111, May 9, 2016, pp. 1-6.
(Continued)

*Primary Examiner* — Grace Park

(57) ABSTRACT

A predictor interactive learning system of the present invention includes a machine learning unit configured to perform machine learning of a predictor that outputs a predicted value indicating a likelihood of being a predetermined intrinsic expression, by using teacher data and teacher labels, an interest score calculation unit configured to obtain an interest score according to statistical data of a corresponding word in a corpus including the predicted value of the predictor for each of words of the corpus, an interactive learning frame unit configured to extract the word serving as the teacher data used in next learning of the predictor according to the interest score, and a question-response unit configured to output a question of whether the extracted teacher data is an intrinsic expression of which the likelihood is predicted by the predictor, and to acquire a teacher label corresponding to the teacher data, as a response to the
(Continued)

question, in which the machine learning unit performs machine learning of the predictor using teacher data extracted by a teacher word extraction unit and a teacher label acquired by an interaction unit.

5 Claims, 10 Drawing Sheets

(51) Int. Cl.
*G06N 5/04* (2023.01)
*G06N 20/00* (2019.01)

(56) References Cited

U.S. PATENT DOCUMENTS

2020/0184017 A1\* 6/2020 Batra .................... G06F 16/953
2021/0027141 A1\* 1/2021 MacAvaney ............ G06F 17/15

OTHER PUBLICATIONS

Saito, Kuniko, Imamura, Kenji, "Tag Confidence Measure for Semi-Automatically Updating Named Entity Recognition", Journal of Natural Language Processing, Jul. 30, 2010, vol. 17, No. 4, pp. 3-21.
International Search Report (English and Japanese) issued in PCT/JP2021/000046, mailed Apr. 6, 2021; ISA/JP.

\* cited by examiner

FIG. 2A

There are various animals in this world, for example, dogs, cats, and rabbits. Usually dogs eat meat and cats eat fish. Animals that eat meat include dogs, bears, and wolves.

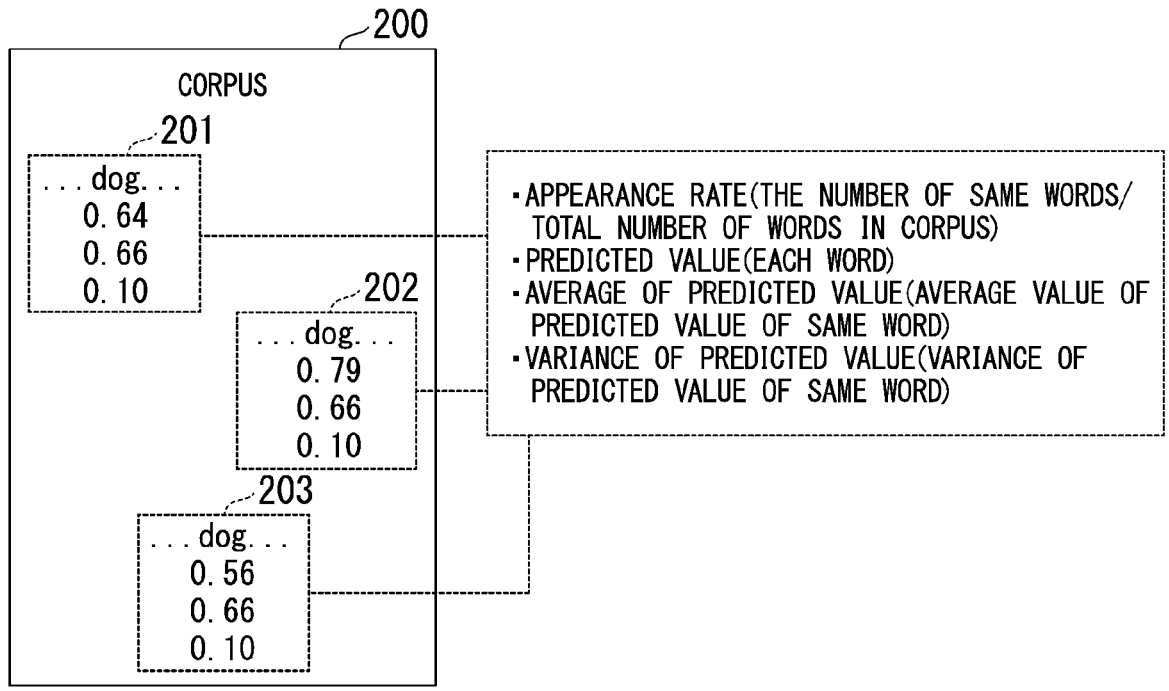

FIG. 10

| QUESTION TABLE | TEACHER DATA | QUESTION SENTENCE |
|---|---|---|
| | bears | IS IT ANIMAL? |
| | and | IS IT ANIMAL? |
| | wolves | IS IT ANIMAL? |
| | are | IS IT ANIMAL? |
| | ⋮ | ⋮ |

FIG. 11

| QUESTION-RESPONSE LIST | TEACHER DATA | ANSWER |
|---|---|---|
| | bears | YES(true) |
| | and | NO(false) |
| | wolves | YES(true) |
| | are | NO(false) |
| | ⋮ | ⋮ |

FIG. 12

| TEACHER DATA TABLE | TEACHER DATA | TEACHER LABEL |
|---|---|---|
| | dogs | 1 |
| | ****** | ******* |
| | ****** | ******* |
| | cats | 1 |
| | bears | 1 |
| | and | 0 |
| | wolves | 1 |
| | are | 0 |
| | ⋮ | ⋮ |

FIG. 13

| SEED TABLE | TEACHER DATA | TEACHER LABEL |
|---|---|---|
| | dogs | ANIMAL |
| | ****** | ******* |
| | ****** | ******* |
| | cats | ANIMAL |
| | ⋮ | ⋮ |

PREDICTOR INTERACTIVE LEARNING SYSTEM, PREDICTOR INTERACTIVE LEARNING METHOD, AND PROGRAM

CROSS-REFERENCE TO RELATED APPLICATIONS

This application is a 371 U.S. National Phase of International Application No. PCT/JP2021/000046 filed on Jan. 5, 2021, which claims the benefit of priority from Japanese Patent Application No. 2020-000443 filed on Jan. 6, 2020. The entire disclosure of the above application is incorporated herein by reference.

TECHNICAL FIELD

The present invention relates to a predictor interactive learning system, a predictor interactive learning method, and a program for learning a predictor (a prediction model) that is a language analysis model.

Priority is claimed on Japanese Patent Application No. 2020-443, filed Jan. 6, 2020, the content of which is incorporated herein by reference.

BACKGROUND ART

Conventionally, a predictor is known as a language analysis model that extracts an intrinsic expression for an input having a series structure such as a word (a character, a character string, and a symbol) in sentence data of text, a document, or the like.

When this predictor is a machine learning model, the predictor first performs machine learning using each combination of teacher data and a teacher label. Next, the predictor inputs sentence data to be analyzed, and predicts an eigenvalue expression of each word in the sentence data, that is, predicts a possibility of something being a word of a label learned by the predictor.

Here, for example, the predictor outputs a range from "0" to "1" for each word in the sentence data as a predicted value of the eigenvalue expression. This predicted value indicates that something has a higher possibility of being the label as this predicted value is closer to "1."

In addition, when the predictor described above is caused to perform learning, it is necessary to cause it to perform learning using a large amount of teacher data and teacher labels to improve accuracy of prediction of something being the label.

For this reason, a learning device that causes the predictor to perform learning using teacher data and teacher labels is used (refer to, for example, Patent Literature 1).

PRIOR ART DOCUMENTS

Patent Documents

Patent Document 1

Japanese Unexamined Patent Application, First Publication No. 2008-225907

SUMMARY OF INVENTION

Problems to be Solved by the Invention

In the learning of a predictor described above, it is necessary to perform learning using much teacher data and many teacher labels to improve accuracy in prediction of an eigenvalue expression.

However, it is not clear whether each of the teacher data and the teacher labels used for learning is effective for the learning of a predictor. That is, it is not known whether each of the teacher data and the teacher labels used for learning is data that improves accuracy in prediction of a predictor.

For this reason there is a disadvantage that the accuracy in prediction of a predictor cannot be improved even if much teacher data and many teacher labels are used, or it takes a long time to cause it to perform learning until a predetermined accuracy in prediction is obtained. That is, there is a disadvantage that efficient learning of a predictor cannot be performed.

The present invention has been made in view of such circumstances. An object of the present invention is to provide a predictor interactive learning system, a predictor interactive learning method, and a program that can perform the learning of a predictor in a shorter period of time by using a smaller amount of teacher data and fewer teacher labels than in the past.

Means for Solving the Problems

A predictor interactive learning system of the present invention includes a machine learning unit configured to perform machine learning of a predictor that outputs a predicted value indicating a likelihood that an input word is a predetermined intrinsic expression, by using predetermined teacher data and teacher labels, an interest score calculation unit configured to obtain an interest score corresponding to statistical data of a corresponding word in a corpus including the predicted value of the word that the predictor outputs for each of words of the corpus used for the machine learning, an interactive learning frame unit configured to extract the word serving as the teacher data in next learning of the predictor from the corpus according to the interest score, and a question-response unit configured to output a question of whether the extracted teacher data is an intrinsic expression of which the likelihood is predicted by the predictor, and to acquire a teacher label corresponding to the teacher data as a response to the question, in which the machine learning unit performs machine learning of the predictor using teacher data extracted by the interactive learning frame unit and a teacher label acquired by the question-response unit for the teacher data.

In the predictor interactive learning system of the present invention, the interest score calculation unit may calculate an interest score by obtaining each average value of a first interest score corresponding to a normalization rank of an appearance rate of the word in the corpus, a second interest score corresponding to each predicted value output by the predictor when each of the words in a corresponding corpus is input, a third interest score corresponding to a variance of a corresponding predicted value, and a fourth interest score corresponding to an average value of the predicted value.

The predictor interactive learning system of the present invention may further include an initial interest score calculation unit configured to calculate an initial interest score serving as an interest score for selecting teacher data for an initial question from each of the words in the corpus according to a predetermined calculation rule by using a combination of the teacher data input as a seed and the teacher label when the machine learning of the predictor is started, in which the calculation rule may be a rule for obtaining the initial interest score for each of the words according to a degree of matching between other words arranged adjacent to front and rear parts of a word of the teacher data input as the seed in the corpus and other words arranged adjacent to front and rear parts of each of the words in the corpus.

In the predictor interactive learning system of the present invention, the interactive learning frame unit may extract the teacher data corresponding to the initial interest score from each of the words in the corpus, and the question-response unit may acquire a response indicating whether each piece of the teacher data corresponding to the initial interest score is a teacher label corresponding to teacher data input as a seed.

A predictor interactive learning method of the present invention includes a machine learning process in which a machine learning unit performs machine learning on a predictor to be learned using teacher information including predetermined teacher data and teacher labels, an interest score calculation process in which an interest score calculation unit obtains an interest score corresponding to statistical data including the predicted value of the predictor to be learned for a corresponding word for each word in the corpus, which is the teacher information, an interactive learning process in which an interactive learning frame unit extracts a teacher word serving as teacher data of the predictor from the corpus according to the interest score, and a question-response process in which a question-response unit outputs a question of whether the teacher word is an eigenvalue expression as an eigenvalue expression as a label of the predictor, and acquires a teacher label corresponding to the teacher word as a response to the question, in which the machine learning unit performs machine learning of the predictor by using, teacher data ted by the interactive learning frame unit and a teacher label acquired for a corresponding piece of teacher data.

A program of the present invention causes a computer to function as a machine learning means for performing machine learning of a predictor that outputs a predicted value indicating a likelihood that an input word is a predetermined intrinsic expression, by using predetermined teacher data and teacher labels, an interest score calculation means for obtaining an interest score corresponding to statistical data of a corresponding word in a corpus including the predicted value of the word that the predictor outputs for each of words of the corpus used for the machine learning, an interactive learning frame means for extracting the word serving as the teacher data in next learning of the predictor from the corpus according to the interest score, and a question-response means for outputting a question of whether the extracted teacher data is an intrinsic expression of which the likelihood is predicted by the predictor, and to acquire a teacher label corresponding to the teacher data as a response to the question, in which the machine learning means performs machine learning of the predictor using teacher data extracted by the interactive learning frame means and a teacher label acquired by the question-response means for the teacher data.

Advantageous Effects of the Invention

According to the present invention, it is possible to provide a predictor interactive learning system, a predictor interactive learning method, and a program capable of performing the learning of a predictor in a shorter period of time with a smaller amount of teacher data and fewer teacher labels than in the past.

BRIEF DESCRIPTION OF DRAWINGS

FIG. 2A is a diagram which shows sentence data for learning as an example of a corpus in the present embodiment.

FIG. 8 is a conceptual diagram which shows an appearance rate, a predicted value, an average value of the predicted value, and a valiance of the predicted value of each word in a corpus in this embodiment.

FIG. 9 is a table which shows a question list generated by an interactive learning frame unit in this embodiment.

FIG. 10 is a table which shows an example of a question presented to a user by a question-response unit in this embodiment.

FIG. 11 is a table which shows an example of a response to a question output by the question-response unit in this embodiment.

FIG. 12 is a table which shows an example of teacher data and teacher labels written in a teacher data storage unit in this embodiment.

FIG. 13 is a table which shows an example of a seed table in a rule-based question data storage unit n this embodiment.

EMBODIMENTS FOR CARRYING OUT THE INVENTION

Figure 1:
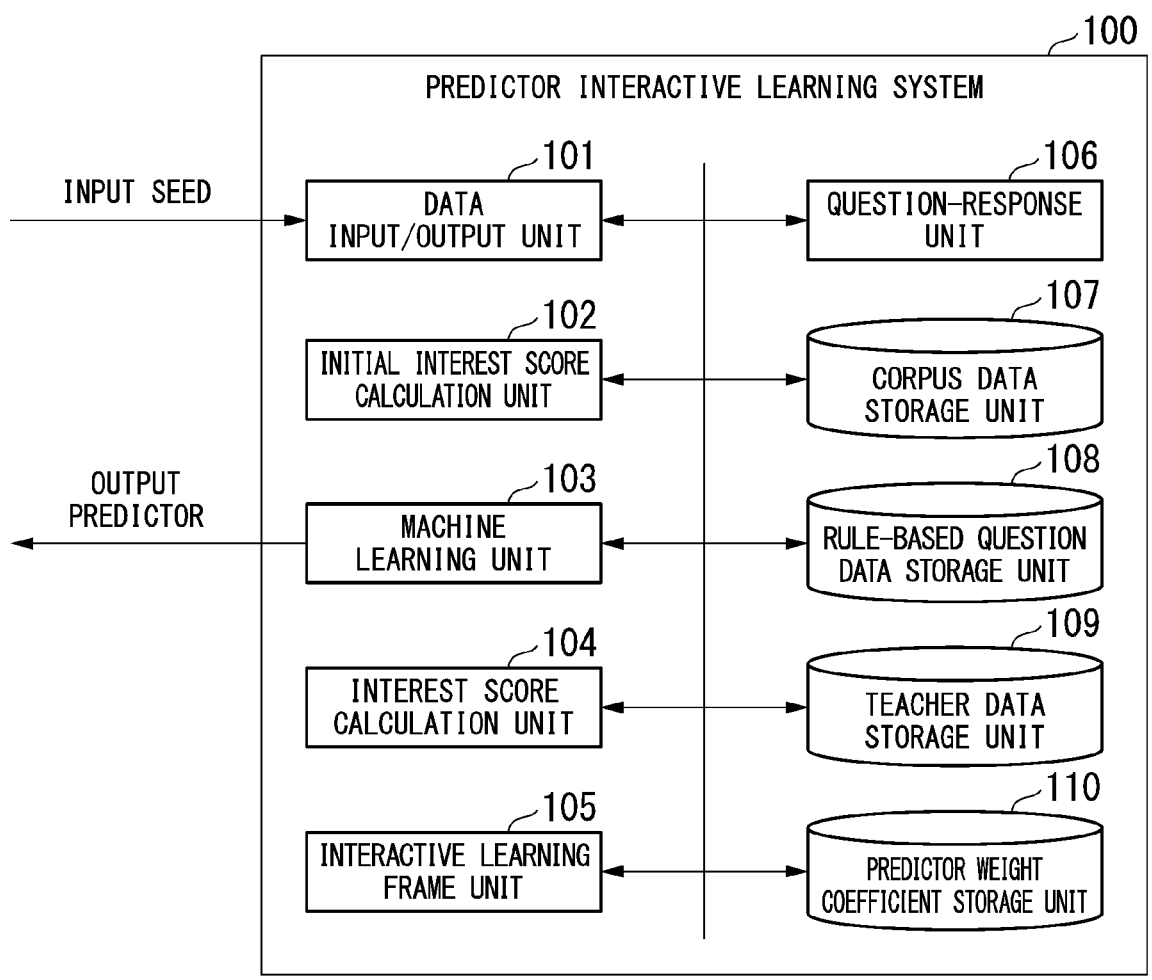
FIG. 1 is a block diagram which shows a configuration of a predictor interactive learning system according to an embodiment of the present invention.

Hereinafter, a predictor interactive learning system according to an embodiment of the present invention will be described with reference to the drawings. In the present embodiment, a machine learning model to be learned by the predictor interactive learning system is a predictor that predicts each intrinsic expression of a word in a natural language sentence (sentence data). FIG. 1 is a diagram showing a configuration example of a predictor interactive learning system according to an embodiment of the present invention. In FIG. 1, the predictor interactive learning system 100 includes a data input/output unit 101, an initial interest score calculation unit 102, a machine learning unit 103, an interest score calculation unit 104, an interactive learning frame unit 105, a question-response unit 106, a corpus data storage unit 107, a rule-based question data storage unit 108, a teacher data storage unit 109, and a predictor weight coefficient storage unit 110.

The data input/output unit 101 writes and stores data of a corpus (corpus data) input from an external device in the corpus data storage unit 107.

FIG. 2A shows a character array of sentence data for learning as an example of a corpus. This sentence data for learning is a structure of a natural language sentence, and is decomposed into words (including symbols) by morphological analysis.

Figure 3:
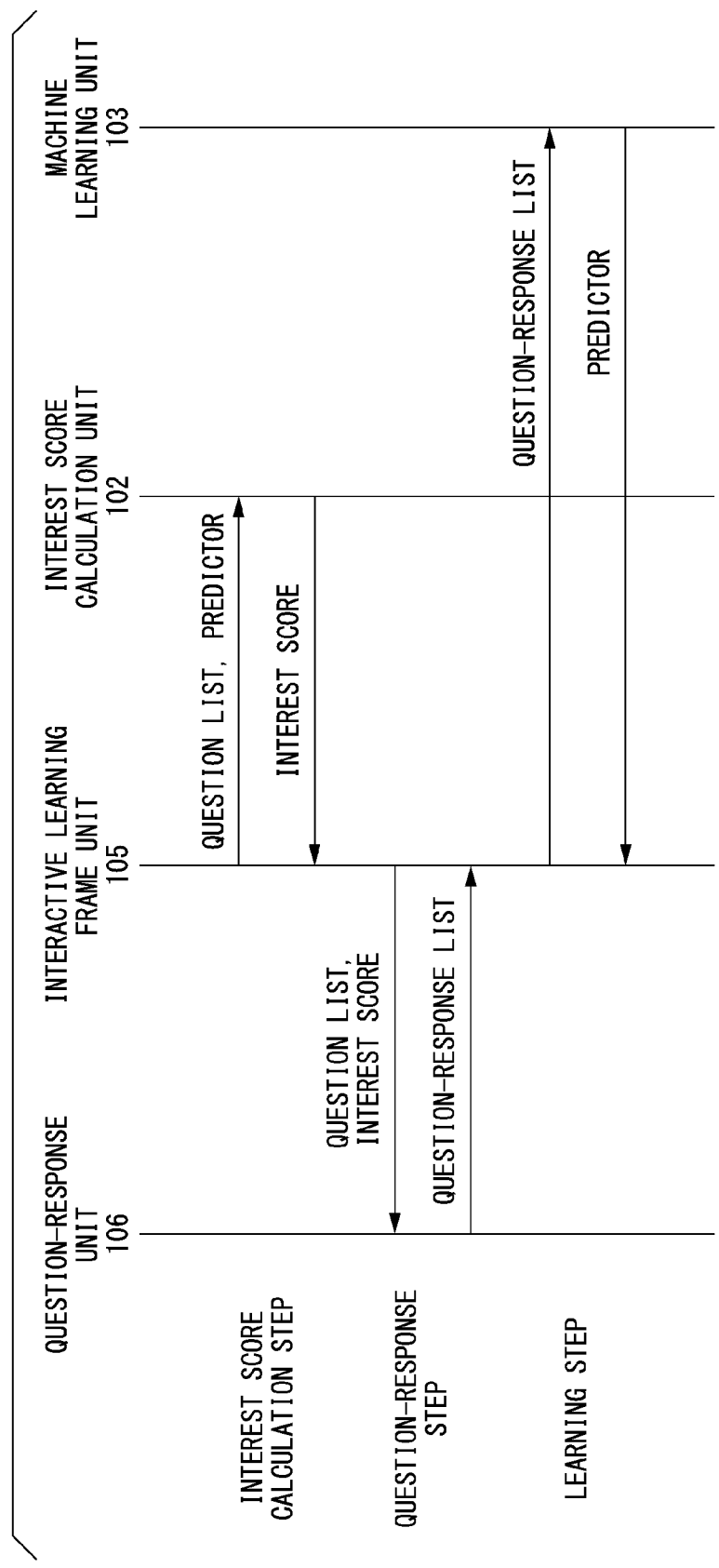
FIG. 3 is a sequence diagram which shows each step of learning processing of the predictor interactive learning system in this embodiment.

FIG. 3 is a sequence diagram which shows a concept of each step of learning processing of the predictor interactive learning system 100 in the present embodiment.

In the interactive 1 predictor earning system 100 of the present embodiment, an interest score calculation step, a question-response step, and a learning step shown in FIG. 3 are relocated. The predictor interactive learning system 100 performs learning of a predictor that outputs a predicted value of an intrinsic expression of each word when sentence data is input. This learning is learning of a weight coefficient of each function in a predictor, but the details will be described below.

Here, in the interest score calculation step, when each word of the corpus described above is input, the interest score calculation unit 104 obtains an interest score for each word in the corpus based on a predicted value output by a predictor that is performing learning and a statistic value for each word. This interest score indicates a degree of learning efficiency for a predictor, which is used to extract a word used as teacher data in the next learning.

In addition, in the question-response step, the question-response unit 106 asks a user to perform determination on whether a word extracted from an interest score as teacher data corresponds to an intrinsic expression that a predictor predicts. Next, in this question-response step, it acquires a teacher label for the word from the user as a response to the question, and generates a combination of teacher data and teacher labels.

In the learning step, the learning of a predictor is performed according to the teacher data and the teacher labels acquired in the question-response step. After the learning, the interactive learning system 100 acquires a predicted value of each word in a corpus of this predictor, and shifts to the interest score calculation step.

It is assumed that a predictor repeats the interest score calculation step the question-response step, and the learning step described above, for example, a predetermined number of times, and outputs a predicted value for an intrinsic expression in sentence data.

When each predictor used, for example, to extract the intrinsic expression of a technical term in a document, it is desirable to select a corpus (including a word as a similar technical term) for each specialty is a field to be extracted, and to cause the selected corpus to be learned.

Returning to FIG. 1, the data input/output unit 101 writes and stores sentence data for learning of the corpus used for the learning of a predictor supplied from the external device in the corpus data storage unit 107.

In addition, the data input/output unit 101 writes and stores seeds (data of initial teacher data and teacher labels) input from input means such as a keyboard and a touch panel in the rule-based question data storage unit 108.

The initial interest score calculation unit 102 calculates initial interest scores of all words in the corpus described above using seeds as the initial teacher data and teacher labels supplied frown the outside.

In the present embodiment, the learning of a predictor to be learned is performed according to teacher data and teacher labels, a corpus is input to this predictor, the predicted value of each word is obtained, and an interest score corresponding to this predicted value is calculated. According to this interest score, teacher data and teacher labels used for the next learning of a predictor are acquired. For this reason, at the time of starting the learning, a predicted value of the predictor cannot be acquired and an interest score cannot be acquired. Therefore, an initial interest score based on a rule is calculated. Calculation of this initial interest score will be described in detail below.

The machine learning unit 103 uses teacher data and teacher labels to generate a predictor that is a machine learning model, that is, to perform learning of a weight coefficient of each function in the predictor (a learning step in FIG. 3). The teacher data and the teacher labels are recorded in a teacher data table shown in FIG. 12, which is created based on a question and response list in FIG. 3, which will be described below. The learning of a weight coefficient of each function in the predictor is, for example, learning of a parameter of an input weight coefficient of a function in each layer in the case of a neural network such as a recurrent neural network (RNN). In the following description, this learning is simply referred to as "learning of a predictor."

Next, the machine learning unit 103 writes and stores the weight coefficient of each function in the predictor obtained bye the learning in the predictor weight coefficient storage unit 110, and updates it to a new weight coefficient obtained each time the learning is performed.

The machine learning unit 103 ends the learning of a predictor when the number of times the learning of a predictor has been performed reaches the predetermined set number of times the learning ends, and generates and outputs a predictor corresponding to a weight coefficient at a corresponding time.

The machine learning unit 103 may be configured to end the learning of a predictor when a predicted value output by the predictor at the time of learning is set to be equal to or higher than a preset end threshold value.

The interest score calculation unit 104 acquires a predicted value of each word used to extract an intrinsic expression in a corpus from a predictor being learned, and an interest core is calculated based on a word including this predicted value and a statistical value corresponding to the predicted value (interest score calculation step in FIG. 3). The predicted value indicates a numerical value in a range of "0" to "1" output by predictor (here, a learning predictor) as a label of a predetermined intrinsic expression (for example, "animal" or the like) of each word. As the predicted value is closer to "1," a likelihood of being a predicted predetermined intrinsic expression increases.

In the present embodiment, the interest score described above is obtained as, for example, an average value of four interest scores of a first interest score, a second interest score interest score, and a fourth interest score.

The first interest score is obtained according to a normalization rank (a range of 0 to 1) of the appearance rate obtained by dividing the number of appearances of the same word in a corpus by the total number of words of the corpus. For example, if a corpus is formed of 15 words A, A, A, A, B, B, B, C, C, C, C, C, D, D, and E in which each of the words A, B, C, D and E is used, the appearance rate is 4/15 for the word A, 3/15 for the word B, 5/15 for the word C, 2/15 for the word D, and 1/15 for the word E, A rank of the appearance rate is second for the word A, third for the word B, first for the word C, fourth for the word D, and fifth for the word E. The normalization rank of the appearance rate is 0.75 for the word A, 0.5 for B, 1.0 for C, 0.25 for D, and 0.0 for E.

The second interest score corresponding to the predicted value (the range of 0 to 1) of a word output by the predictor is obtained. The third interest score corresponding to the average value (the range of 0 to 1) obtained by averaging the predicted values of the same word is obtained. The fourth interest score corresponding to the variance (the range of 0 to 1) of the predicted values of the same word is obtained. As will be described below, each of the first interest score, the second interest score, the third interest score, and the fourth interest score is standardized according; to the maximum value thereof.

Here, in the present embodiment, for each graph of the first interest score to the fourth interest score, coordinate values (two-dimensional coordinates formed of a vertical axis and a horizontal axis) used in spline interpolation (cubic spline interpolation) to be described below are created while changing the coordinate values so that learning efficiency is improved in an experiment of performing the learning of a predictor using a plurality of corpora.

Figure 4:
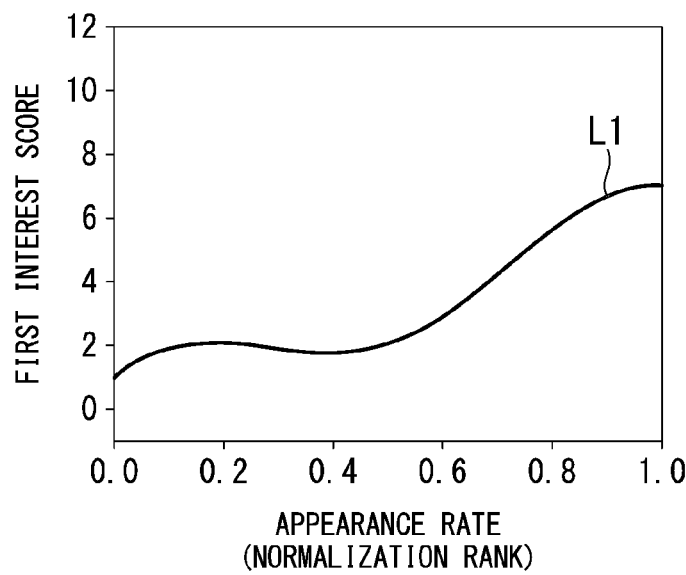
FIG. 4 is a graph which shows a correspondence relation between a first interest score and an appearance rate in this embodiment.

FIG. 4 is a graph which shows a correspondence relation between the first interest score and the appearance rate. In the graph of FIG. 4, the vertical axis shows a numerical value of the first interest score, and the horizontal axis shows the appearance rate. An interest score curve L1 indicates the correspondence relation between the first interest score and the appearance rate.

This interest score curve L1 is obtained by cubic spline interpolation of five coordinate values (0.1,1.0), (0.23,2.0), (0.5,2.0), (0.75,5.0), and (1.0,7.0) with the appearance rate of the horizontal axis set to x=(0.1,0.23,0.5,0.75,1.0) and the first interest score of the vertical axis set to y=(1.0,2.0,2.0, 5.0,7.0).

It is conceivable that the interest score curve L1 has a shape in which the first interest score becomes higher as the appearance rate increases, there are many positions where the same word exists in the corpus, and information on the same word for a wider range of the corpus can be obtained.

Figure 5:
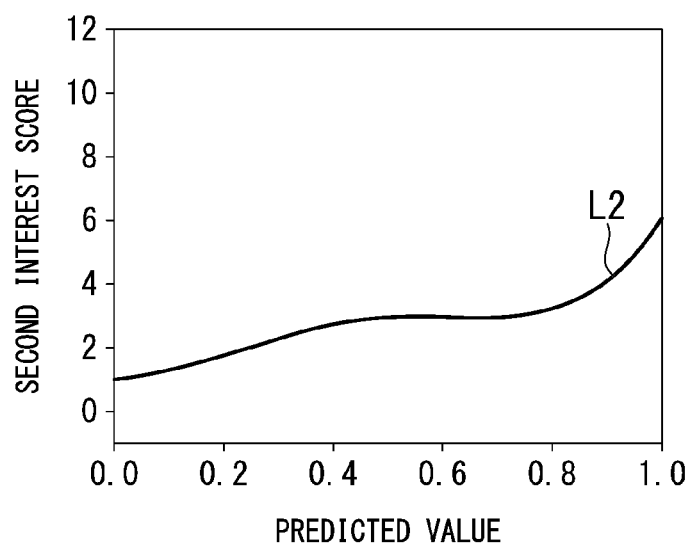
FIG. 5 is a graph which shows a correspondence relation between a second interest score and a predicted value in this embodiment.

FIG. 5 is a graph which shows a correspondence relation between the second interest core and the predicted value. In the graph of FIG. 5, the vertical axis shows a numerical value of the second interest score, and the horizontal axis shows the predicted value. An interest score curve L2 indicates the correspondence relation between the second interest score and the predicted value.

This interest score curve L2 is obtained by cubic spline interpolation of five coordinate values (0.1,1.0), (0.25,2.0), (0.5,3.0) 0.75,3.0), and (1.0,6.0) with a prediction rate of the horizontal axis set to x=(0.1,0.25,0.5,0.75,1.0), and the second interest score of the vertical axis set to y=(1.0,2.0, 3.0,3.0,6.0).

The interest score curve L2 has a lot of false (=0) data in a combination of teacher data and teacher labels using an intrinsic expression. Since a likelihood that a predicted value of teacher data to be questioned is true (=1) becomes higher as the predicted value increases, teacher data of a teacher label of true (=1) and teacher of a teacher label of false (=0) have a good balance and can be used for prediction learning. Therefore, it is conceivable that the interest score curve L2 has a shape in which the likelihood of the predicted value of a predictor is further improved and the number of times of the learning of a predictor is reduced.

Figure 6:
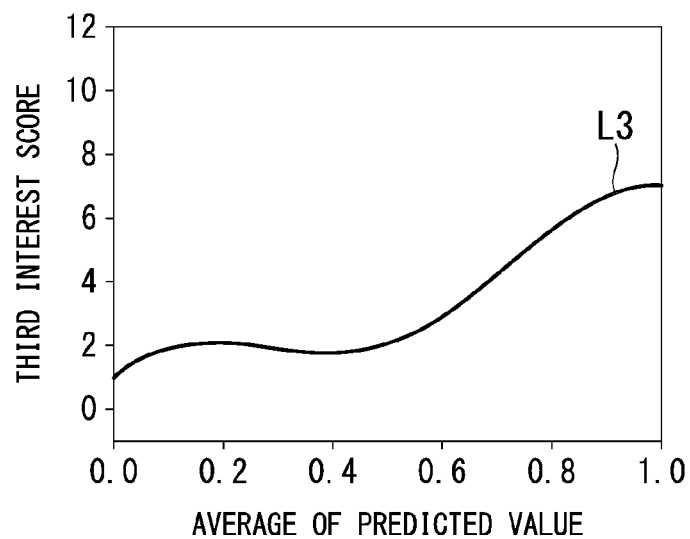
FIG. 6 is a graph which shows a correspondence relation between a third interest score and an average value of a predicted value in this embodiment.

FIG. 6 is a graph which shows a correspondence relation between the third interest score and an average value of a predicted value. In the graph of FIG. 6, the vertical axis shows a numerical value of the third interest score, and the horizontal axis shows the average value of the predicted value. The interest score curve L3 shows the correspondence relation between the third interest score and the average value of the predicted value.

This interest score curve L3 is obtained by the cubic spline interpolation of five coordinate values (0.1,1.0), (0.25, 2.0), (0.5,2.0), (0.75,5.0), and (1.0,7.0) with the average value of the predicted value of the horizontal axis set to x=(0.1,0.25,0.5,0.75,1.0) and the third interest score of the vertical axis set to y=(1.0,2.0,2.0,5.0,7.0).

Similar to the interest score curve L2, the interest score curve L3 has a lot of false (=0) data in the combination of teacher data and teacher labels using an intrinsic expression. Since the likelihood that the predicted value of teacher data to be questioned is true (=1) becomes higher as the average value of the predicted value increases, the teacher data of the teacher label of true (=1) and the teacher data of the teacher label of false (=0) have a good balance and can be used for prediction learning Therefore, it is conceivable that the interest score curve L3 has a shape in which the likelihood of the predicted value of a predictor is further improved and the number of times of the learning of a predictor is reduced.

Figure 7:
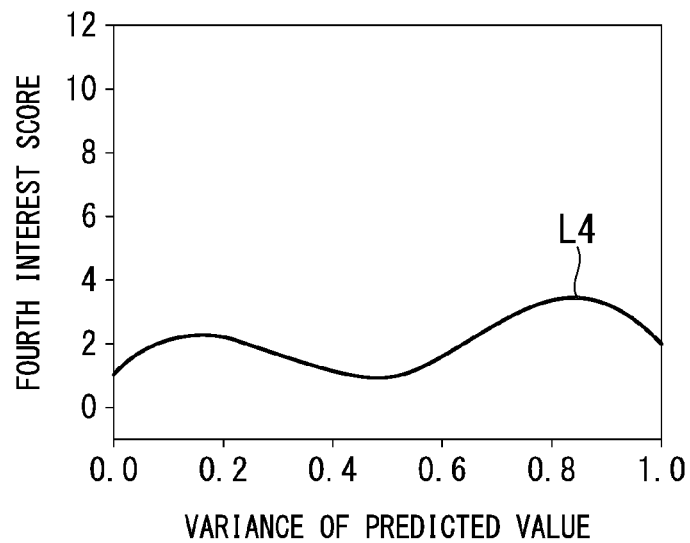
FIG. 7 is a graph which shoes a correspondence relation between a fourth interest score and a variance of a predicted value in this embodiment.

FIG. 7 is a graph which shows a correspondence relation between the fourth interest score and a variance of the predicted value. In the graph of FIG. 7, the vertical axis shows a numerical value of the fourth interest score, and the horizontal axis shows the variance of the predicted value. The interest score curve L4 shows the correspondence relation between the fourth interest score and the variance of the predicted value.

This interest score curve L4 is obtained by the cubic spline interpolation of five coordinate values (0.1,1.0), (0.25, 2.0), (0.5,1.0), (0.75,3.0), and (1.0,2.0) with the variance of the predicted value of the horizontal axis set to x=(0.1,0.25, 0.5,0.75,1.0) and the fourth interest score of the vertical axis set to y=(1.0,2.0,1.0,3.0,2.0).

In the interest score curve L4, as the variance of the predicted value increases, since the fourth interest core increases and a magnitude of the predicted value differs at positions in which the same words are present in a corpus, that is, each of the same words appears in a variety of different contexts, it is conceivable that the interest score curve has a shape in which a learning efficiency is higher than when each of the same words appears in similar contexts.

FIG. 8 is a conceptual diagram which describes an appearance rate, a predicted value, an average value of the predicted value, and a variance of the predicted value of each word in a corpus.

In FIG. 8, a word "dog" is used as an example of words in a corpus. The interest score calculation unit 104 refers to the corpus and obtains the number of words, which is the number of words of the word "dog" in the corpus. Next, the interest score calculation unit 104 divides the number of words of the word "dog" by the total number of words, which is the number of words of all the words in the corpus, and obtains the appearance rate of the word "dog."

That is, the interest score calculation unit 104 obtains the appearance rate for obtaining a first interest score of each word as a rate of the same word in the corpus. This appearance rate is standardized in a range of 0 to 1 according to a maximum value of the appearance rate of each word in the corpus.

For example, in the corpus 200 shown in FIG. 8, when the total number of words is 100, the appearance rate is "0.03" because the word "dog" is present at three positions 201, 202, and 203. When the appearance rate of the word "dog" is the highest, the appearance rate of the word "dog" is set to "1" by standardizing.

The interest score calculation unit 104 standardizes the predicted values of each word output by a predictor during learning, and sets the standardized values as predicted values for obtaining the second interest score of each word.

In addition, the predicted value indicates a numerical value in the range of "0" to "1" output by the predictor as a label of a predetermined intrinsic expression (for example, an animal or the like) of each word. As the predicted value is closer to "1," the likelihood of being a predicted predetermined intrinsic expression increases. In FIG. 8, the predicted value of the word "dog" at the position 201 of the corpus 200 is 0.64, the predicted value of the word "dog" at the position 202 is 0.79 and the predicted value of the word "dog" at the position 203 is 0.56.

Next, the interest score calculation unit 104 obtains the average value of the predicted value (one of a non-standardized numerical value or a standardized numerical value may be used) for each of the same words, and sets it as an average value of the predicted value for obtaining the third interest score of each of the same words.

In FIG. 8, since the predicted values of the word "dog" at each of the positions 201, 202, and 203 are 0.64, 0.79, and 0.56, the average value is 0.66.

The interest score calculation unit 104 obtains variance of the predicted values for each of the same words, and sets it as variance of the predicted value for obtaining fourth interest score of each of the same words.

In FIG. 8, since the predicted values of the word "dog" at each of the positions 201, 202, and 203 are 0.64, 0.79, and 0.56, and the average value of the predicted value is 0.66, the variance of the predicted value is 0.1.

The interest score calculation unit 104 obtains an average value of the first interest score, the second interest score, the third interest score, and the fourth interest score of each word in the corpus, and sets this average value as the interest score of each word.

For example, the first inter score of the word "dog" at the position 201 in the corpus 200 in FIG. 8 is obtained as 8 according to FIG. 4 because the appearance rate is 1. Similarly, the second interest score of the word "dog" is obtained as 2 according to FIG. 5 because the predicted value is 0.64. The third interest score of the word "dog" is obtained as 1.5 according to FIG. 6 because the average value of the predicted value is 0.66.

Also, fourth interest score of the word "dog" is obtained as 1.8 according to FIG. 7 because the variance of the predicted value is 0.10. For this reason, the interest score of the word "dog" at the position 201 is obtained as (8+2+1.5+18)/4=5.88.

Next, the interest score calculation unit 104 calculates the interest score of each word "dog" at the positions 202 and 203, obtains an average value of each interest score at the positions 201 to 203, and sets this average value as the interest score of the word "dog" in the corpus 200.

The interactive learning frame unit 105 refers to the interest score of each of words (same words) in the corpus 200, and allocates a probability that each word is selected (extracted) as teacher data corresponding to a magnitude of each interest score. The interactive learning frame unit 105 extracts a predetermined number of words as teacher data according to the probability. For example, when there are only two words of a word A and a word B, the interest score of the word A is 1, and the interest score of the word B is 2, probabilities are allocated to each word with a probability that the word A will be selected as teacher data set to 1/3 and a probability that the word B will be selected as teacher data et to 2/3. As a result, the probability that the ward B will be selected as teacher data will be twice as that of the word A, and the word B will be selected twice as easily as the word A.

At this time, the interactive learning frame unit 105 refers to a teacher data table (a table of FIG. 12 to be described below) of the teacher data storage unit 109, and excludes a word already extracted as teacher data from a target for extracting the teacher data.

Next, the interactive learning frame unit 105 performs processing of randomly extracting a word set as teacher data from words in the corpus 200 according to the probability that each word will be selected, which has been described above. The interactive learning frame unit 105 sets the extracted teacher data as a question list, assigns each interest score to the question list, and outputs it to the question-response unit 106.

In addition, the interactive learning frame unit 105 is provided with a question/response list for this question list from the question-response unit 106.

Then, the interactive learning frame unit 105 outputs a question response table in which each of teacher labels that are responses to a question is assigned to each piece of teacher data that Lire questions in the question list to the machine learning unit 103.

FIG. 9 is a diagram which shows a configuration example of the question list generated by the interactive learning frame unit 105. Teacher data and interest scores are associated, respectively, for each record.

The question-response unit 106 presents questions corresponding to the question list supplied from the interactive learning frame unit 105 to a user as, for example, a question table, and acquires teacher labels corresponding to the teacher data that are responses to the questions front the user (the question-response step in FIG. 3).

Then, the question-response unit 106 acquires the responses of the user to the questions for the teacher data, and outputs the question-response list in which this teacher data and the responses are associated to the interactive learning frame unit 105.

FIG. 10 is a diagram which shows a configuration example of the question table presented to the user by the question-response unit 106.

In FIG. 10, teacher data and a question for the teacher data are shown for each record. When a predictor to be learned is a machine learning model that outputs a predicted value indicating a likelihood of being an "animal" as the intrinsic expression of each word in sentence data, the question for the teacher data is "is it an animal?" in the present embodiment, the question table is described as an example, but another method may be also used as an output format.

FIG. 11 is a diagram which shows a configuration example of the question response table output by the question-response unit 106. In FIG. 11, teacher data and responses (answer) to the teacher e shown for each record. For the responses, any one of yes (true) or no (false) is shown as an answer to "is it an animal?" from a user for each piece of the teacher data. Here, yes (true) indicates "1" as a teacher label, and no (false) indicates "0" as a teacher label. In the present embodiment, the question response table is described as an example, but another method may be used as the output format.

FIG. 12 is a diagram which shows a configuration example of the teacher data table written in the teacher data storage unit 109. In FIG. 12, teacher data and "0" or "1" as a teacher label corresponding to this teacher data are shown for each record.

In FIG. 12, "yes (true)" in FIG. 11 is set to the teacher label "1," and "no (false)" is set to the teacher label "0." The interactive learning frame unit 105 adds new teacher data and teacher labels as a new record to the teacher data table of the teacher data storage unit 109 by the question-response list supplied from the question-response unit 106.

Next, the calculation of an initial interest score by the initial interest score calculation unit 102 will be described.

In the present embodiment, the initial interest score is calculated according to a seed of teacher data. When the learning of a predictor s performed using the corpus of FIGS. 2A and 2B, for example, when the intrinsic expression to be predicted is an animal, the seed is a word such as "dog" or "cat."

The user inputs seed words one by one in an input field on an initial question selection screen (not shown). As a result, the data input/output 101 writes and stores a seed table in which seeds such as "dogs" and "cats" and the intrinsic expression "animal" are shown in the rule-based question data storage unit 108. In the present embodiment, it is described as a seed table as an example, but another method may also be used as the output format.

FIG. 13 is a diagram shows a configuration example of the seed table in the rule-based question data storage unit 108. In the seed table of FIG. 13, a seed word (teacher data) and a label of a seed word (data indicating 1 or 0, teacher label) indicating an intrinsic expression corresponding; to this seed word (teacher data) are shown for each record.

Figure 2B:
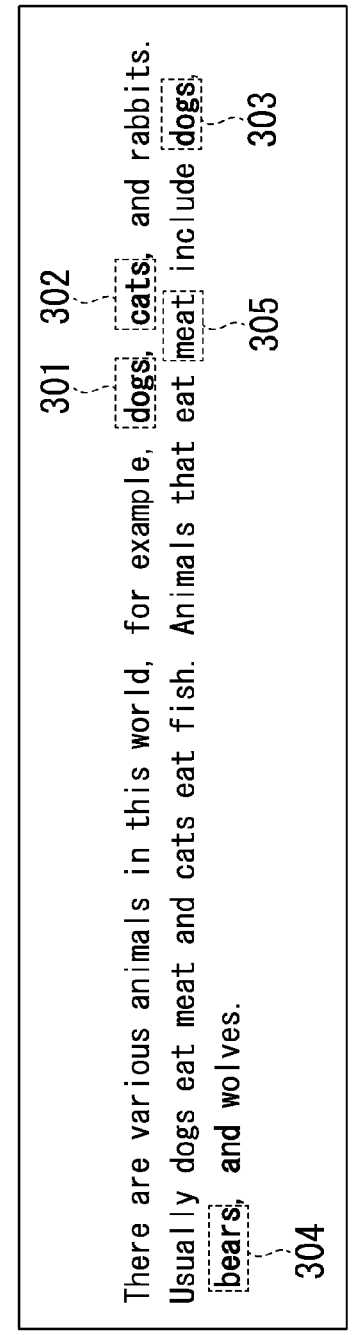
FIG. 2B is a diagram which shows a position of a seed word in the sentence data for learning shown in FIG. 2A.

As a result, the initial interest score calculation unit 102 refers to the seed table of the rule-based question data storage unit 108, and extracts words adjacent to the input seed words such as "dogs" and "cats" (adjacent words) from the corpus shown in FIG. 2A. In this embodiment, as shown in FIG. 2B, as an example, four target seed words of two in a front part and two in a rear part are extracted. The number of adjacent words can be arbitrarily set.

For example, in FIG. 2B, there are four adjacent words of the seed word "dogs" at a position 301, such as two adjacent words of "example" and "," in the front part, and two of "," and "cats" in the rear part.

There are four adjacent words of the seed word "cats" at a position 302, such as two adjacent words of "dogs" and "," in the front part and two of "," and "and" in the rear part.

There are four adjacent words of the seed word "dogs" at a position 303, such as two adjacent words of "mammal" and "," in the front part and two of "," and "bears" in the rear part.

The adjacent words described above are characters (including symbols such as signs ", (comma)" and ": (colon)") or character strings (including one character).

The initial interest score calculation unit 102 calculates the interest score used to extract teacher data of a predictor from words other than a seed according to the following rule in processing of initial question selection.

First, the initial interest score calculation unit 102 extracts the adjacent all the words in an entire corpus by the same processing as in the case of a word of the seed described above (hereinafter referred to as a seed word).

For example, the initial interest score calculation unit 102 extracts, as shown in FIG. 2B, "dogs" and "," in the front part and "," and "and" in the rear part from the corpus in FIG. 2A as adjacent words of a word "bear" at a position 304, which is a word other than the seed. Similarly, the initial interest score calculation unit 102 extracts "dogs" and "cat" in the front part and "and" "cats" in the rear part as adjacent words to a word "meat" a position 305.

The initial interest score calculation unit 102 compares the adjacent words of the seed word with the adjacent words of all words in an entire corpus, and outputs a matching state of the adjacent words between the seed word and each word (the number of matching words) as a result of the comparison, that is, an interest score.

When the adjacent words of the word "bears" and the seed word (a position 302) "cats" are compared, "dogs" and "," in the front part and "," and "and" in the rear part, that is, all four words in the front and rear parts, match, respectively, the initial interest score of the word "bears" is 4.

In addition, when the adjacent words of the word "meat" and the seed word (the position 302) "cats," are compared, as a result of comparison between "dogs" and "cat" in the front part and "and" and "cats" in the rear part of "meat" and "dogs" and "," in the front part and "," and "and" in the rear part of "cats," "dogs" and "and" in each of "meat" and "cats" are matched.

However, in a rule of the present embodiment, even if there is a word that matches in the adjacent words, the interest score can be 0 when it does not match a first adjacent word that is adjacent on both sides of a seed word.

Therefore, in the comparison between the adjacent words of the word "meat" and the seed word (the position 302) "cats" described above, the matching "dogs" and "and" see not first adjacent words but second adjacent words which are adjacent words positioned across the first adjacent words, the interest score of the word "meat" is set to 0.

And, when the same word is present in a plurality of places in a corpus, maximum value of the interest score of a target word obtained in the plurality of places is obtained as the initial interest score of the same word.

Here, the initial interest score calculation unit 102 outputs the initial interest score of each of words in the corpus to the interactive learning frame unit 105.

The interactive learning frame unit 105 extracts each word whose initial interest score is 3 or more when an initial interest score supplied from the initial interest score calculation unit 102 is a threshold value set in advance, for example, when the threshold value is 3.

In addition, the interactive learning frame unit 105 generates a question list with the extracted words set as teacher data, and outputs the generated question list to the question-response unit 106.

As a result, as already mentioned, the question-response unit 106 performs processing of acquiring each teacher label (that is, an animal (=1) or a non-animal (=0)) of the teacher data of the question list from a user.

Then, in the learning of an initial predictor, the learning of the predictor is performed such that each of a seed word and a word extracted) by the interactive learning frame unit 105 according to the initial interest score is set as teacher data, and a teacher label corresponding to this teacher data is set as a predicted value.

An interest score for extracting teacher data used for second and subsequent learnings is obtained by, as already described, the interest score calculation unit 104 inputting each word in a corpus and corresponding to a predicted value output by each predictor.

Figure 14:
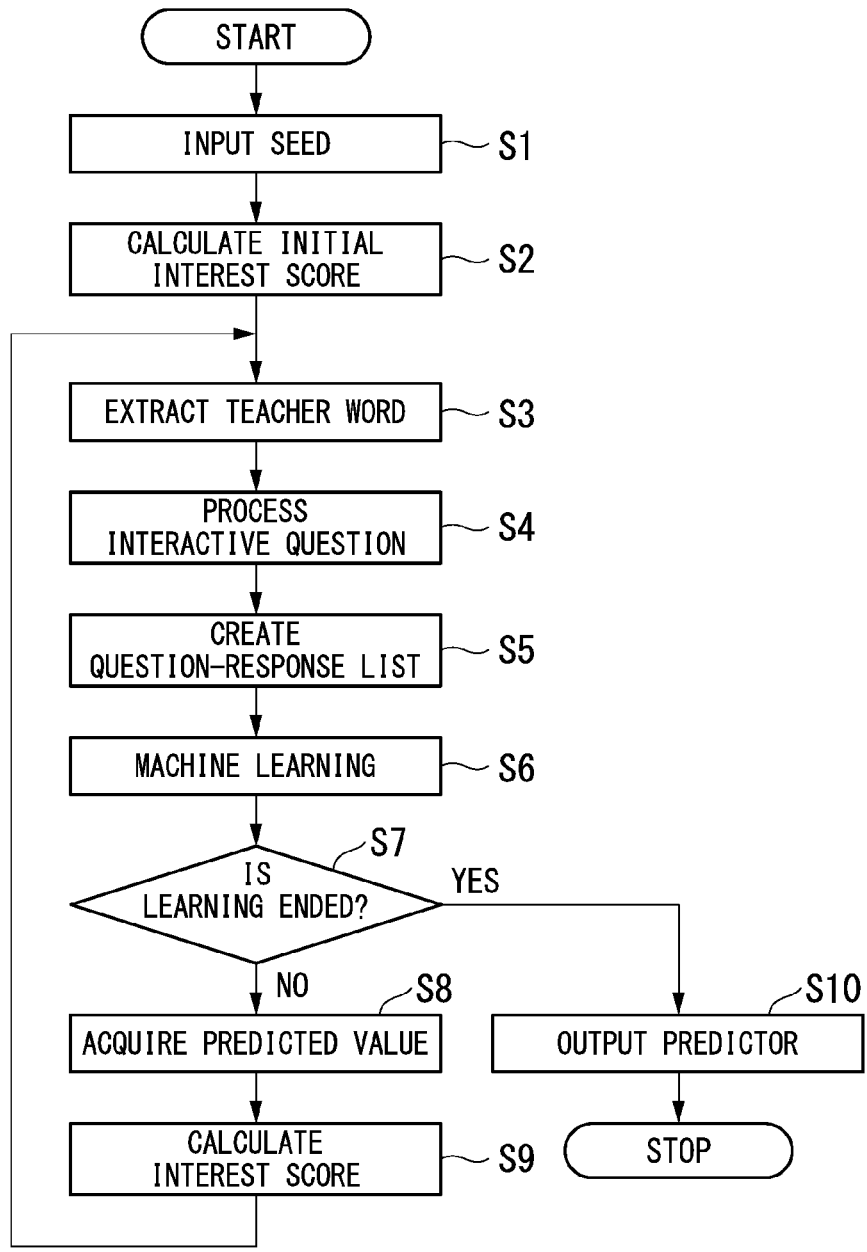
FIG. 14 is a flowchart which shows an operation example in learning processing of a predictor performed by the predictor interactive learning system in this embodiment.

FIG. 14 is a flowchart which shows an operation example in learning processing of a predictor performed by the predictor interactive learning system 100 according to the present embodiment.

Step S1: A user inputs a seed word to the predictor interactive learning system 100. For example, when a predictor outputs a predicted value indicating a likelihood at which a word expresses an animal as an intrinsic expression of the word, "dogs" and "cats" are input to the predictor interactive learning system 100 as words that express animals as seed words in the corpuses of FIGS. 2A and 2B.

Step S2: The data input/output unit 101 outputs each of the input seed words the initial interest score calculation unit 102.

The initial interest score calculation unit 102 compares the adjacent words of the seed word with the adjacent words of all words in a corpus, and calculates the initial interest score of each word in the corpus.

Next, the initial interest score calculation unit 102 outputs the calculated initial interest score to the interactive learning frame unit 105.

Step S3: As a result, the interactive learning frame unit 105 extracts a ward corresponding to the initial interest score equal to or more that the threshold value set in advance from the initial interest score supplied from the initial interest score calculation unit 102.

The interactive learning frame unit 105 generates a question list with the word corresponding to the initial interest scare set as teacher data.

Next, the interactive learning frame unit 105 outputs the generated question list to the question-response unit 106.

In addition, the interactive learning frame unit 105 randomly extracts a word from the corpus according to a probability that the generated second and subsequent question lists will be selected as teacher data corresponding to the interest score generated by the interest score calculation unit 104, and generates a question list with the extracted word set as teacher data.

Step S4: The interactive learning frame unit 105 outputs the generated question list (FIG. 9) to the question-response unit 106.

The question-response unit 106 displays a question table (FIG. 10) on a display screen (not shown) based on the supplied question list, asks a question of whether a label for teacher data is correct, and urges a user to respond.

Step S5: The question-response unit 106 generates a question response table (FIG. 11) according to a response to each piece of the teacher data in the question table (the label is one of true (=1) or false (=0)).

Then, the question-response unit 106 outputs the generated question response table to the interactive learning frame unit 105.

The interactive learning frame unit 105 outputs the question response table supplied from the question-response unit 106 to the machine learning unit 103.

Step S6: The machine learning unit 103 extracts new teacher data and teacher label ("11" when a word is an intrinsic expression or "0" when a word is not an intrinsic expression) from the question response table, and additionally rites and stores them in a teacher data table (FIG. 12) in the teacher data storage unit 109.

Next, the machine learning unit 103 performs learning processing for adjusting a weight coefficient in a function of the predictor according to teacher data and a teacher label shown in the teacher data table.

As a result, the machine learning unit 103 writes and stores an adjusted weight coefficient in the predictor weight coefficient storage unit 110.

Step S7: The machine learning unit 103 determines whether the number of times the learning of the predictor has been performed has reached the preset number of times the learning ends.

At this time, the machine learning unit 103 advances the processing to step S8 when the number of learning times is not equal to or more than the preset number of times the learning ends, that is, when the number of learning times is less than the preset number of times the learning ends.

On the other hand, the machine learning unit 103 advances the processing to step S10 when the number of learning times is equal to or more than the preset number of times the learning ends.

Step S8: The machine learning unit 103 outputs a predicted value output by the predictor for each word in the corpus at the moment to the interest score calculation unit 104.

The interest score calculation unit 104 acquires the predicted value output by the predictor for each word in the corpus from the machine learning unit 103.

Step S9: The interest score calculation unit 104 calculates the interest score of each word according to the acquired predicted value of each word.

Then, the interest score calculation unit 104 outputs the calculated interest score to the interactive learning frame unit 105.

Step S10: The machine learning unit 103 outputs a predictor having a weight coefficient in the function of the predictor, stored in the predictor weight coefficient storage unit 110.

As a result, according to the predictor interactive learning system of the present embodiment, it is possible to acquire teacher data and teacher labels used in the learning of the predictor according to the interest score indicating a degree of learning efficiency of the predictor, and it is possible to perform the efficient learning of the predictor with a smaller amount of teacher data and fewer teacher labels than in the past and with the smaller number of learning times than in the past.

A predictor to be learned in the predictor interactive learning system of the present embodiment outputs a likelihood (a numerical value in a range of 1 indicating "true" to 0 indicating "false") that each word in sentence data is a word indicating a predetermined intrinsic expression (for example, "animal").

When an intrinsic expression extractor that extracts a predetermined intrinsic, expression word from any sentence data is constituted using this predictor, words whose predicted values are equal to or more than a predicted value set in advance are extracted as predetermined intrinsic expressions corresponding to the predictor, and each of the extracted words and an appearance position of each word are output as extracted data.

When this intrinsic expression extractor includes a first predictor that outputs a predicted value indicating a likelihood of being an "animal" as an intrinsic expression, and a second predictor that extracts a predictor indicating a likelihood of being a "plant" as an intrinsic expression, for example, when the sentence data to be input is "Most rabbits eat cabbage, and cats eat Cat Grass," a data array of {"animal":[[2,1], [7,1], . . . ], "plant":[[4,1], [9,2], . . . ]} is output as an output.

In the data array described above, "animal": [[2,1], [7,1], . . . ] means that a word whose intrinsic expression "animal" expressed as [2 (a second word), 1 (constituted from one word (rabbits))], [7 (a seventh word), 1 (one word (rabbits))], and the like.

Moreover, "plant": [[2,1], [7,1], . . . ] means that a word whose intrinsic expression is "plant" is expressed as [4 (a fourth word), 1 (constituted from one word (cabbage))], [9 (a ninth word), 2 (two words (Cat Grass))], and the like.

In the present embodiment, teacher data has been described using one word, but a word whose likelihood is estimated by the predictor learned by the predictor interactive learning system 100 is not limited to a word constituted front only one word, but a multi-word in which two or words are arranged consecutively are also set as a word to be extracted (that is a word as a unit for estimating a likelihood).

For this reason, as processing of word division (definition of a word) in preprocessing of a corpus, not only one word but also a multi-word, for example, a multi-word in which two words are consecutive is also registered as a word.

Here, the maximum number of consecutive words of a multi-word to be defined as one word is set in advance in this preprocessing stage. For example, when it is set that a multi-word having a maximum of two consecutive words is et as a word, one word and a multi-word in which two words are consecutive, such as "rabbits," "dogs," "cabbage," "meat," "rabbits eat," "Cat Grass," and "Most rabbits" in the corpus of FIGS. 2A and 2B, are registered as a unit word for estimating the intrinsic expression, respectively.

In addition, in a combination of teacher data and teacher labels as an initial seed, a phrase constituted from one or each of a plurality of words is set as teacher data, and is also used for initial learning of the predictor.

For example, in the corpus of FIGS. 2A and 2B, "dogs," "Cat Grass," and the like are used as teacher data, and "being a plant (true)" and "not being a plant (false)" are used as teacher labels in the estimation of an intrinsic expression to calculate the initial interest score of all words (words consisting of one word and two consecutive words) in a corpus and to generate a question list.

As for the generation of the second and subsequent question lists, as already described, learning corresponding to the initial question list is performed on the predictor, and a result of the estimation of the predictor is obtained. As a result, the interest score calculation unit 104 corresponds to an interest score generated based on the result of the estimation of the predictor to be learned, randomly extracts a word from the corpus according to a probability of being selected as teacher data, and generates a question list front which teacher data and teacher labels to be used for next learning are acquired.

With learning using the question list described above, the predictor to be learned estimates an intrinsic expression, for example, a likelihood of being "plant", with respect to one word "cabbage" or "dogs," and two consecutive words "Cat Grass," and "various animals." As a result, as an intrinsic expression extractor, a word whose intrinsic expression is "plant" can be output as extracted data, as described above, in a form of [4 (a fourth word), 1 (constituted from one word (cabbages))], and [9 (a ninth word), 2 (two words (Cat Grass))].

In addition, a program for realizing a function of performing learning processing of an interactive predictor by asking a question or responding by the predictor interactive learning system shown in FIG. 1 may be recorded on a computer-readable recording medium, and this program recorded in this recording medium may be caused to be read and executed by a computer system, and thereby processing of performing the learning processing of an interactive predictor by asking a question or responding may also be performed. The terra "computer system" as used herein includes an OS and hardware such as peripheral devices.

In addition, it is assumed that the "computer system" includes a homepage provision environment (or a display environment) if a WWW system is used.

In addition, the "computer-readable recording medium" refers to a portable medium such as a flexible disk, a magneto-optical disc, a ROM, or a CD-ROM, and a storage device such as a hard disk embedded in the computer system. Moreover, it is assumed that the "computer-readable recording medium" includes those that dynamically hold a program for a short period of tinge, like a communication line in the case of transmitting, a program via a network such as the Internet or a communication line such as a telephone line, and those that holds a program for a certain period of time, like a volatile memory inside the computer system, which serves as a server or a client this case. Furthermore, the program may be a program for realizing a part of the functions described above, and may also be a program that can further realize the functions described above in combination with a program already recorded in the computer system.

As described above, the embodiment of the present invention has been described in detail with reference to the drawings, but the specific configuration is not limited to this embodiment, and the design and the like within a range not departing from the gist of the present invention are also included.

REFERENCE SYMBOLS

100 Predictor interactive learning system
101 Data input/output unit
102 Initial interest score calculation unit
103 Machine learning unit
104 Interest score calculation unit
105 Interactive learning frame unit
106 Question-response unit
107 Corpus data storage unit
108 Rule based question data storage unit
109 Teacher data storage unit
110 Predictor weight coefficient storage unit

The invention claimed is:

1. A predictor interactive learning system comprising:
a machine learning unit configured to perform machine learning of a respective set of parameters of weight coefficients of a respective function in each layer in a neural network, by using predetermined teacher data that are questions in a question list and by using teacher labels that are responses to questions assigned to the teacher data,
the machine learning unit being configured to generate, by performing the machine learning, a predictor as a machine learning model that outputs a respective predicted value indicating a respective likelihood that each input word in a natural language sentence is a respective intrinsic expression, and
the machine learning unit being configured to write and stores, into a predictor weight coefficient storage unit, the respective set of parameters of weight coefficients of the respective function in each layer in the neural network, to update the respective set of parameters of weight coefficients in the predictor weight coefficient storage unit each time of performing the machine learning;
an interest score calculation unit configured to obtain a first interest score according to a normalization rank of a respective appearance rate of each word, the respective appearance rate being obtained by dividing a respective number of appearance of each word in a corpus by a total number of words of the corpus, the corpus being used for perform the machine learning,
the interest score calculation unit being configured to obtain a second interest score corresponding to the respective predicted value that is output from the predictor as the machine learning model in response to an input of each word in the corpus, wherein the predicted value is different in magnitude at different positions of each word in the corpus, where each word appears in a variety of different contexts of the natural language sentence, the interest score calculation unit being configured to obtain a third interest score corresponding to an average value of different magnitudes of the predicted value at the different positions of each word in the corpus, the interest score calculation unit being configured to obtain a fourth interest score corresponding to a respective variance of the different magnitudes of the predicted value at the different positions of each word in the corpus, where each word appears in a variety of different contexts of the natural language sentence, and the different magnitudes of the predicted value is output from the predictor as the machine learning model, the interest score calculation unit being configured to obtain a respective interest score for each word in the corpus, by averaging the first interest score, the second interest score, the third interest score, and the fourth interest score, an interactive learning frame unit configured to refer to the respective interest score for each word in the corpus, calculated by the interest score calculation unit, the interactive learning frame unit being configured to allocate, for each word in the corpus, a respective probability that each word in the corpus is extracted as the teacher data corresponding to a respective magnitude of the respective interest score for each word in the corpus, the interactive learning frame unit being configured to exclude a word already extracted as the teacher data from a set of extraction target words in the corpus in the for extracting the teacher data, the interactive learning frame unit being configured to randomly extract, according to the respective probability allocated for each word in the corpus, a word to be set as an extracted teacher data from the set of extraction target words in the corpus, and a question-response unit configured to output a question of whether the extracted teacher data is the respective intrinsic expression of which the likelihood is predicted by the predictor, and to acquire a teacher label corresponding to the extracted teacher data as a response to the question, wherein the machine learning unit is configured to perform machine learning of the predictor using teacher data extracted by the interactive learning frame unit and the teacher label acquired by the question-response unit for the teacher data.

2. The predictor interactive learning system according to claim 1, further comprising:

an initial interest score calculation unit configured to calculate an initial interest score serving as an interest score for selecting teacher data for an initial question from each of the words in the corpus according to a predetermined calculation rule by using a combination of the teacher data input as a seed and the teacher label when the machine learning of the predictor is started, wherein the calculation rule is a rule for obtaining the initial interest score for each of the words according to a degree of matching between other words arranged adjacent to front and rear parts of a word of the teacher data input as the seed in the corpus and other words arranged adjacent to front and rear parts of each of the words in the corpus.

3. The predictor interactive learning system according to claim 2, wherein the interactive learning frame unit is configured to extract the teacher data corresponding to the initial interest score from each of the words in the corpus, and wherein the question-response unit is configured to acquire a response indicating whether each piece of the teacher data corresponding to the initial interest score is a teacher label corresponding to teacher data input as a seed.

4. A predictor interactive learning method comprising:

performing machine learning of a respective set of parameters of weight coefficients of a respective function in each layer in a neural network, by using predetermined teacher data that are questions in a question list and by using teacher labels that are responses to questions assigned to the teacher data, generating, by performing the machine learning, a predictor as a machine learning model that outputs a respective predicted value indicating a respective likelihood that each input word in a natural language sentence is a respective intrinsic expression, and writing and storing, into a predictor weight coefficient storage unit, the respective set of parameters of weight coefficients of the respective function in each layer in the neural network, to update the respective set of parameters of weight coefficients in the predictor weight coefficient storage unit each time of performing the machine learning;

obtaining a first interest score according to a normalization rank of a respective appearance rate of each word, the respective appearance rate being obtained by dividing a respective number of appearance of each word in a corpus by a total number of words of the corpus, the corpus being used for perform the machine learning, obtaining a second interest score corresponding to the respective predicted value that is output from the predictor as the machine learning model in response to an input of each word in the corpus, wherein the predicted value is different in magnitude at different positions of each word in the corpus, where each word appears in a variety of different contexts of the natural language sentence, obtaining a third interest score corresponding to an average value of different magnitudes of the predicted value at the different positions of each word in the corpus, obtaining a fourth interest score corresponding to a respective variance of the different magnitudes of the predicted value at the different positions of each word in the corpus, where each word appears in a variety of different contexts of the natural language sentence, and the different magnitudes of the predicted value is output from the predictor as the machine learning model, obtaining a respective interest score for each word in the corpus, by averaging the first interest score, the second interest score, the third interest score, and the fourth interest score, referring to the respective interest score for each word in the corpus, calculated by the interest score calculation unit, allocating, for each word in the corpus, a respective probability that each word in the corpus is extracted as the teacher data corresponding to a respective magnitude of the respective interest score for each word in the corpus, excluding a word already extracted as the teacher data from a set of extraction target words in the corpus in the for extracting the teacher data, randomly extracting, according to the respective probability allocated for each word in the corpus, a word to be set as an extracted teacher data from the set of extraction target words in the corpus, outputting a question of whether the extracted teacher data is the respective intrinsic expression of which the likelihood is predicted by the predictor, and acquiring a teacher label corresponding to the extracted teacher data as a response to the question, wherein machine learning of the predictor is performed by using teacher data extracted by the interactive learning frame unit and the teacher label acquired by the question-response unit for the teacher data.

5. A computer program product comprising: a non-transitory computer readable storage medium having program instructions executable by one or more processors to cause the one or more processors to perform predictor interactive learning operations, the predictor interactive learning operations comprising:

performing machine learning of a respective set of parameters of weight coefficients of a respective function in each layer in a neural network, by using predetermined teacher data that are questions in a question list and by using teacher labels that are responses to questions assigned to the teacher data, generating, by performing the machine learning, a predictor as a machine learning model that outputs a respective predicted value indicating a respective likelihood that each input word in a natural language sentence is a respective intrinsic expression, and writing and storing, into a predictor weight coefficient storage unit, the respective set of parameters of weight coefficients of the respective function in each layer in the neural network, to update the respective set of parameters of weight coefficients in the predictor weight coefficient storage unit each time of performing the machine learning;

obtaining a first interest score according to a normalization rank of a respective appearance rate of each word, the respective appearance rate being obtained by dividing a respective number of appearance of each word in a corpus by a total number of words of the corpus, the corpus being used for perform the machine learning, obtaining a second interest score corresponding to the respective predicted value that is output from the predictor as the machine learning model in response to an input of each word in the corpus, wherein the predicted value is different in magnitude at different positions of each word in the corpus, where each word appears in a variety of different contexts of the natural language sentence, obtaining a third interest score corresponding to an average value of different magnitudes of the predicted value at the different positions of each word in the corpus, obtaining a fourth interest score corresponding to a respective variance of the different magnitudes of the predicted value at the different positions of each word in the corpus, where each word appears in a variety of different contexts of the natural language sentence, and the different magnitudes of the predicted value is output from the predictor as the machine learning model, obtaining a respective interest score for each word in the corpus, by averaging the first interest score, the second interest score, the third interest score, and the fourth interest score, referring to the respective interest score for each word in the corpus, calculated by the interest score calculation unit, allocating, for each word in the corpus, a respective probability that each word in the corpus is extracted as the teacher data corresponding to a respective magnitude of the respective interest score for each word in the corpus, excluding a word already extracted as the teacher data from a set of extraction target words in the corpus in the for extracting the teacher data, randomly extracting, according to the respective probability allocated for each word in the corpus, a word to be set as an extracted teacher data from the set of extraction target words in the corpus, outputting a question of whether the extracted teacher data is the respective intrinsic expression of which the likelihood is predicted by the predictor, and acquiring a teacher label corresponding to the extracted teacher data as a response to the question, wherein machine learning of the predictor is performed by using teacher data extracted by the interactive learning frame unit and the teacher label acquired by the question-response unit for the teacher data.

* * * * *